United States Patent [19]

St. Arnauld

[11] Patent Number: 5,077,515

[45] Date of Patent: Dec. 31, 1991

[54] PULSED, ELECTRO-MECHANICAL HIGH-TORQUE MECHANISM WITH ALTERNATOR

[76] Inventor: Ernest E. St. Arnauld, 963 Meriden Ave., Southington, Conn. 06489

[21] Appl. No.: 68,558

[22] Filed: Jul. 1, 1987

[51] Int. Cl.⁵ .............................................. H02K 7/06
[52] U.S. Cl. ......................................... 322/4; 310/23; 74/89
[58] Field of Search ................ 322/4; 310/37, 15, 20, 310/23; 320/61; 74/89

[56] References Cited

U.S. PATENT DOCUMENTS

| | | | |
|---|---|---|---|
| 2,829,530 | 4/1958 | Holden | 310/23 X |
| 2,894,154 | 7/1959 | McVoy | 310/23 |
| 3,105,162 | 9/1963 | Stevenson | 310/23 |
| 4,032,829 | 6/1977 | Schenavar | 322/4 X |
| 4,095,665 | 6/1978 | Armfield | 320/61 X |

Primary Examiner—R. J. Hickey

[57] ABSTRACT

An electro-mechanical power device, has a heavy flywheel and generator driven by a linear reciprocating magnetic core within an inductor assembly, pulsed electrically through a rechargeable battery supply, is intended for automotive vehicles and other uses, in which three (3) versions are described herein.

1 Claim, 6 Drawing Sheets

PULSED, ELECTRO-MECHANICAL HIGH-TORQUE MECHANISM WITH ALTERNATOR

My present invention relates to a pulsed electro-mechanical device for use as a high-torque driving force suitable as a means to provide power for automotive vehicles or other uses.

The general object of my present invention is to provide an economical and pollution free means to produce power.

The general object of my present invention is to provide an economical and pollution free means to produce power.

Another object of the invention is to conserve energy by employing a pulsed drive system, thus shortening the electrical duty cycle.

A further object of the invention is to provide an alternator rectifier means to charge the battery supply.

For a better understanding of the objects and features of the invention, refer to the following detailed description and drawings in which:

FIG. 1 is a side elevation view referencing major component parts of the invention. The use of bearings are referenced and illustrated in simplified cross sections. A cross sectional elevational view of the electro-magnetic driver mechanism is also shown on the drawing.

DETAILED DESCRIPTION OF THE INVENTION

Figure 1:
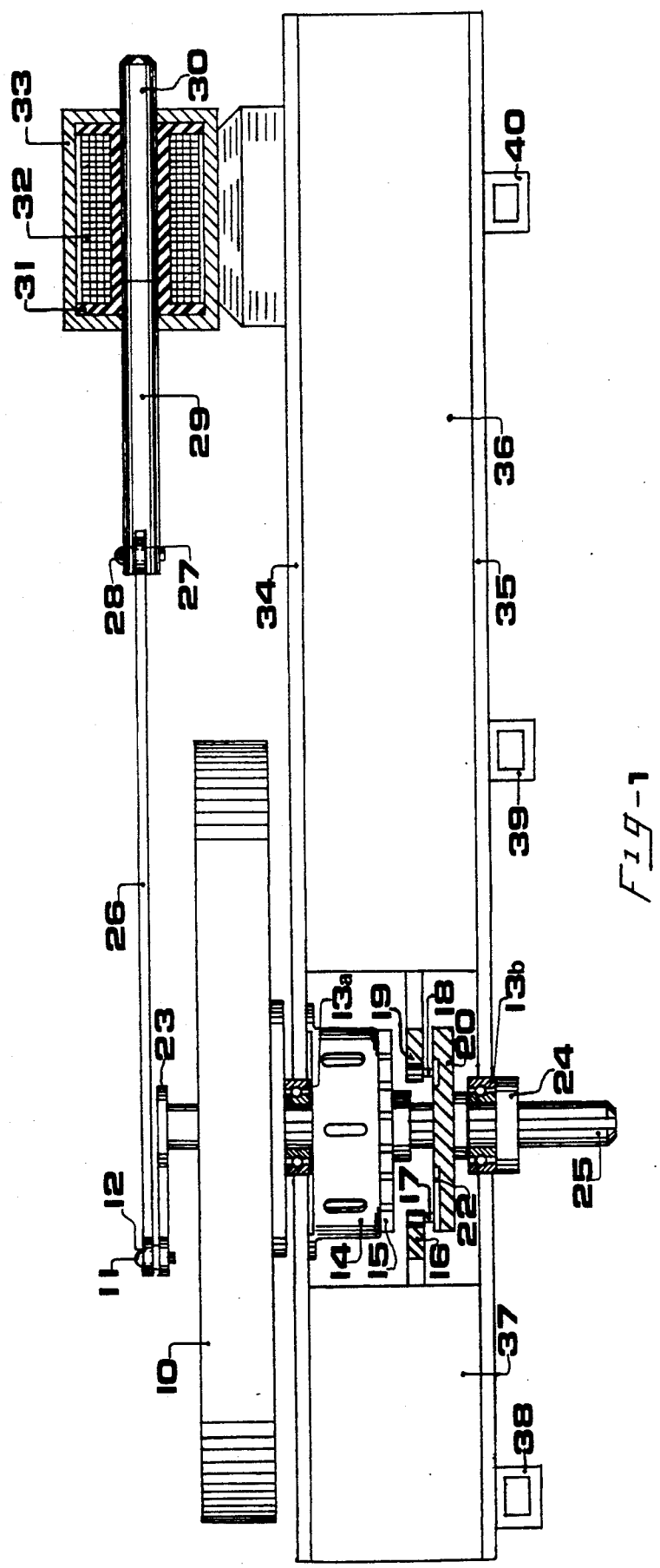

Referring to the drawings, and initially to FIG. 1 thereof, illustrates basic parts of the invention, which are mounted on a main frame assembly comprising a top plate 34, a bottom plate 35, main support 36, forward support 37, and a means to mount the complete mechanism, supported by cross members, 38, 39, and 40.

Mounted on the forward section of the main frame assembly are two bearings, upper bearing 13a and lower bearing 13b which provide a means to mount the main shaft 25 and a means to reduce friction.

On main shaft 25 and within the open area between the top plate 34 and bottom plate 35, are mounted an alternator 14, circulating fan 15, and an insulated commutator assembly 20.

Secured to the insulated commutator assembly 20 shown in cross section is a contact disc 22 which provides a means to make electrical contact with brushes 18 (common) and 17 (timing contact). Brushes 17 and 18 are mounted in brush holders 16 and 19 respectively, which are insulated and secured to the main frame supports 37 and 36.

Figure 2:
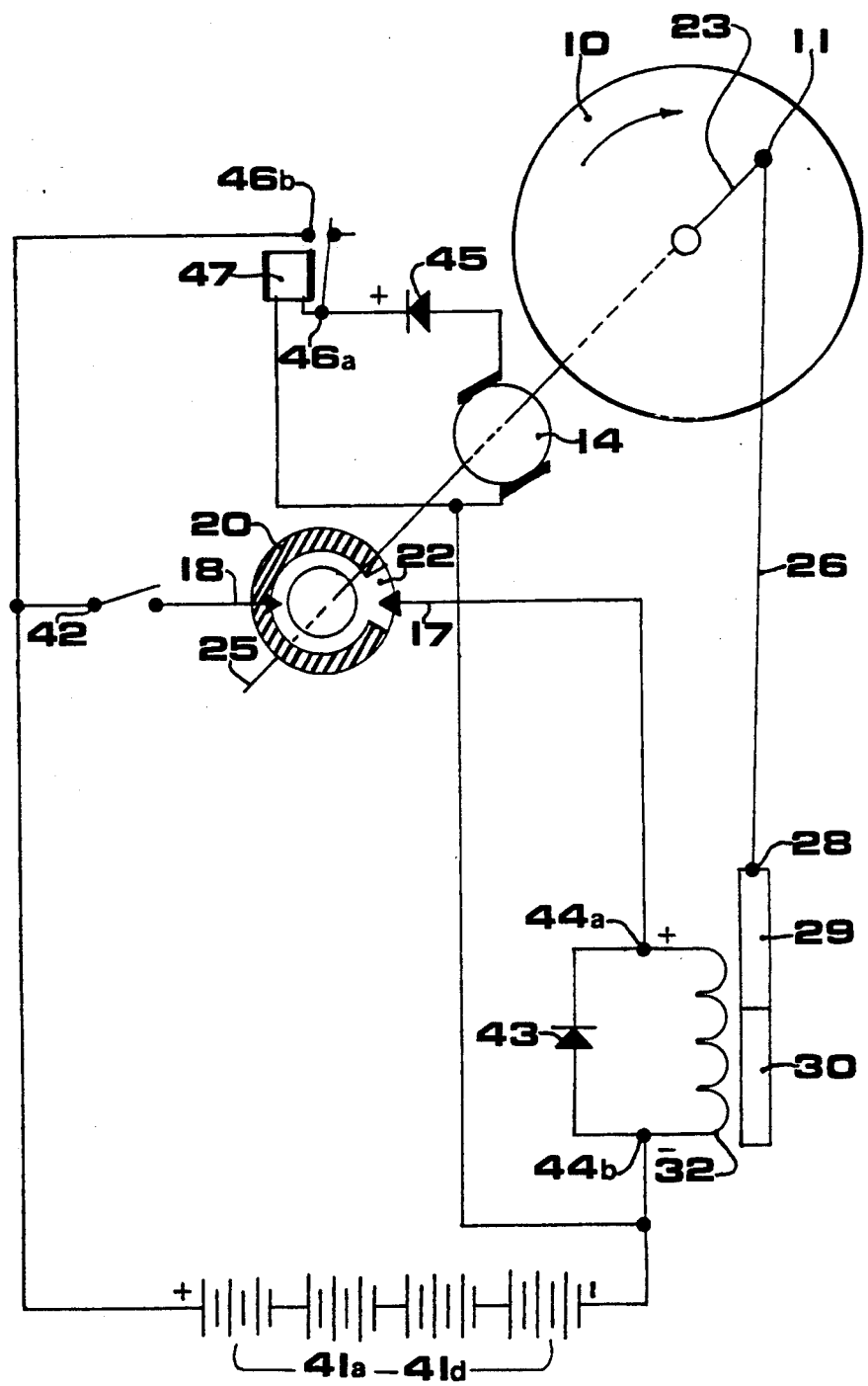
FIG. 2 is a schematic diagram which illustrates basic wiring and a battery supply to operate the invention.

It can be observed from the drawing that the main shaft is keyed and provides a means to secure the commutator to a specific timing position which will be understood when referring to FIG. 2.

Mounted on the main shaft flange (part of the main shaft) 25, and extending above the main frame top plate 34 is a substantially heavy rotor (fly-wheel) 10 intended to perform considerable work when in motion, acting to provide high torque to the main shaft 25. A collar 24 provides a means to contain the main shaft.

Mounted on the main shaft 25 above rotor 10 is a cranking lever 23 and an eccentric shaft 11, with a connecting rod 26 which has bearings 12 and 27, one at each end of the rod to reduce friction. As can be observed from the drawing, rear bearing 27 enters a slot in the front end of the magnetic core 29 and a pivot pin 28 secures it into place.

Attached to the magnetic core 29 is an extension 30 which serves as a follower. It is made of non-magnetic material and is not acted upon in the electrical circuit.

The bobbin 31 shown in the cross sectional view of the electro-magnetic driver assembly serves a dual purpose in that it supports the inductor winding and also provides a linear bearing means for the core assembly 29 and 30.

The electro-mechanical operation of the basic invention shown in FIG. 1 may best be described by referring to FIG. 2, wherein by operating main switch 42 to the on position, with the main shaft 25 under no load, the following sequence of events takes place: Current flows from the positive side of the power supply 41a–41d to the commutator assembly 20, through brush 18 (common), through contact disc 22, through brush 17, to the positive terminal 44a of the inductor 32 and through the inductor at 44b to the negative side of the power supply. The result of this current flow through the inductor 32 causes the magnetic core 29 to be pulled into the inductor to seek its magnetic center. At the same time this action occurs, connecting rod 26 pulls on eccentric 11 of cranking lever 23 and causes rotor 10 to spin in a clockwise direction. When the rotor has traveled beyond one complete revolution, this action is repeated through commutation and causes rotor 10 to accelerate to higher speed.

The manner in which the magnetic core 29 is connected to the cranking lever 23 which revolves with rotor 10 herein, causes the magnetic core to reciprocate, and the pulses of current through the inductor in precise timing, supplies pulsed electro-mechanical power to the rotor in short durations to conserve energy.

When rotor 10 has gained sufficient speed, alternator 14 may be placed into operation as a secondary load. The AC current from the alternator passes through rectifier 45, and the resultant DC potential is applied across the coil of relay 47, which in turn causes contacts 46a and 46b to close, and connects the DC potential across the battery supply 41a–41d, to charge the batteries.

Figure 3:
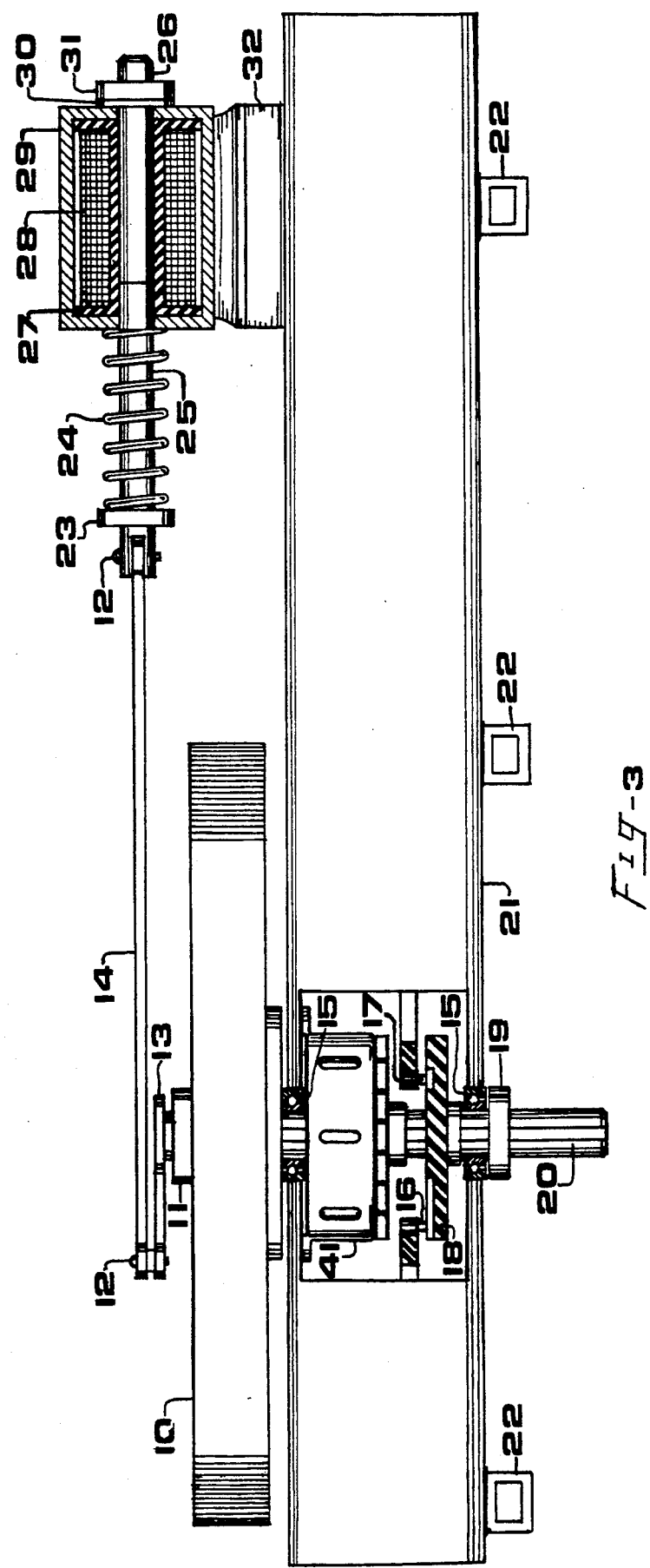
FIG. 3 is a side elevation view of the invention similar to FIG. 1, except that it incorporates a dual electro-magnetic drive system, designed in a pull-push configuration for a large version of the electro-mechanical device.
Figure 4:
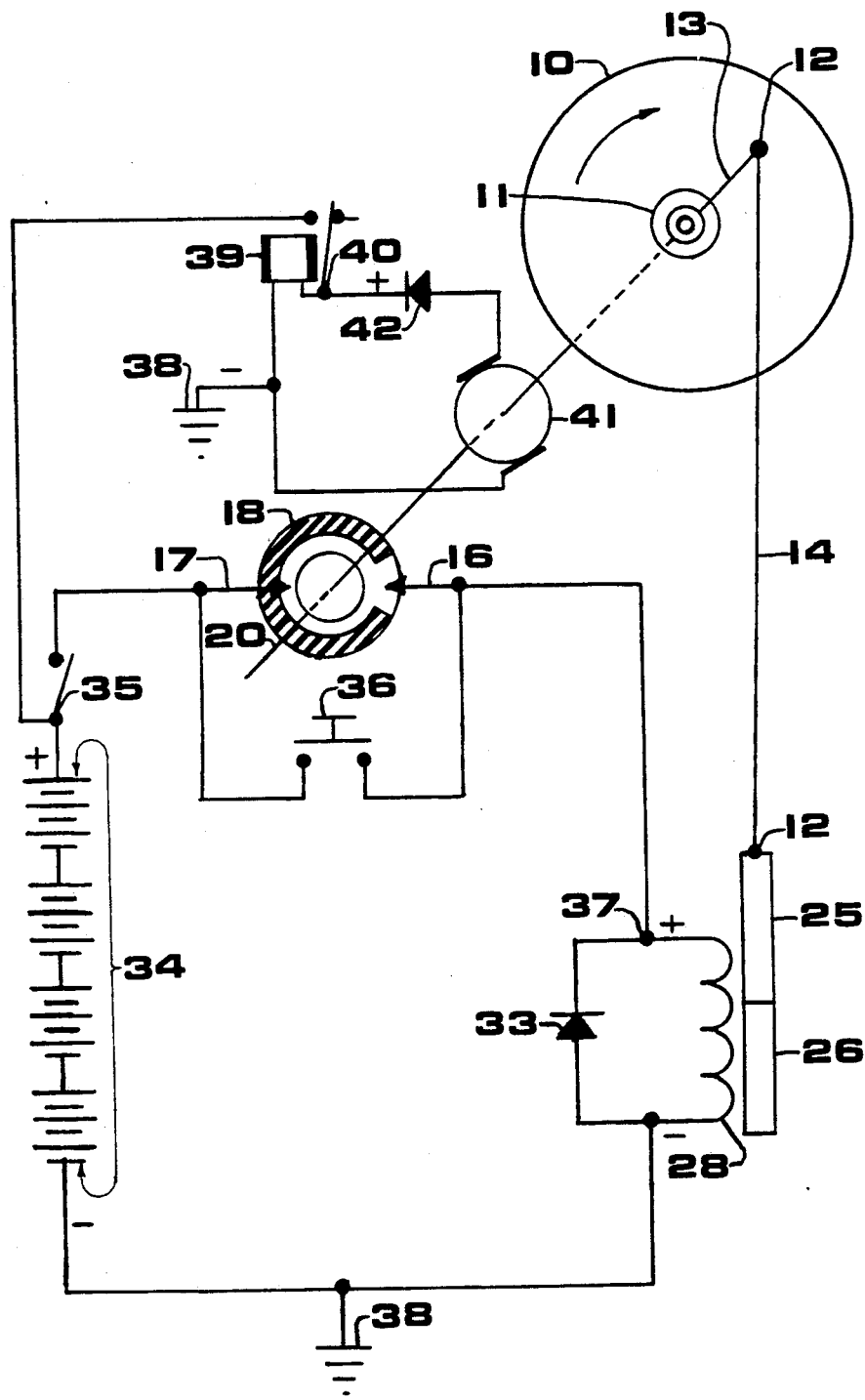
FIG. 4 is a schematic drawing of the electrical wiring for the pull-push drive system of FIG. 3.

Referring to FIG. 3 of the drawings thereof, illustrates a dual electro-magnetic driver mechanism instead of the single version of FIG. 1, and is designed for a large version of the invention, providing two alternate pulses for each revolution of the rotor 10. An additional magnetic core 29a is attached to and in line with the follower 30, an additional brush 17a and holder 16a are mounted to contact with the commutator 20. This configuration represents a pull-push system and may best be explained by referring to the schematic drawing of FIG. 4, in which: Two pulses of current drive inductors 32 and 32a alternately for each revolution of rotor 10. The pulses occur well within each 180 degree half turn of the commutator. With rotor 10 revolving in a clockwise direction as shown on the drawing, the magnetic cores reciprocate in the direction of the arrows, core 29 is pulled into inductor 32 in one direction and core 29a is pulled into inductor 32a in the opposite direction, causing rotor 10 to be pulled and pushed clockwise.

Diodes 43 and 43a across inductors 32 and 32a serve to reduce to a low value, the inductive kick each time the magnetic field collapses in the inductors during the transition to off times as a result of commutation.

Figure 5:
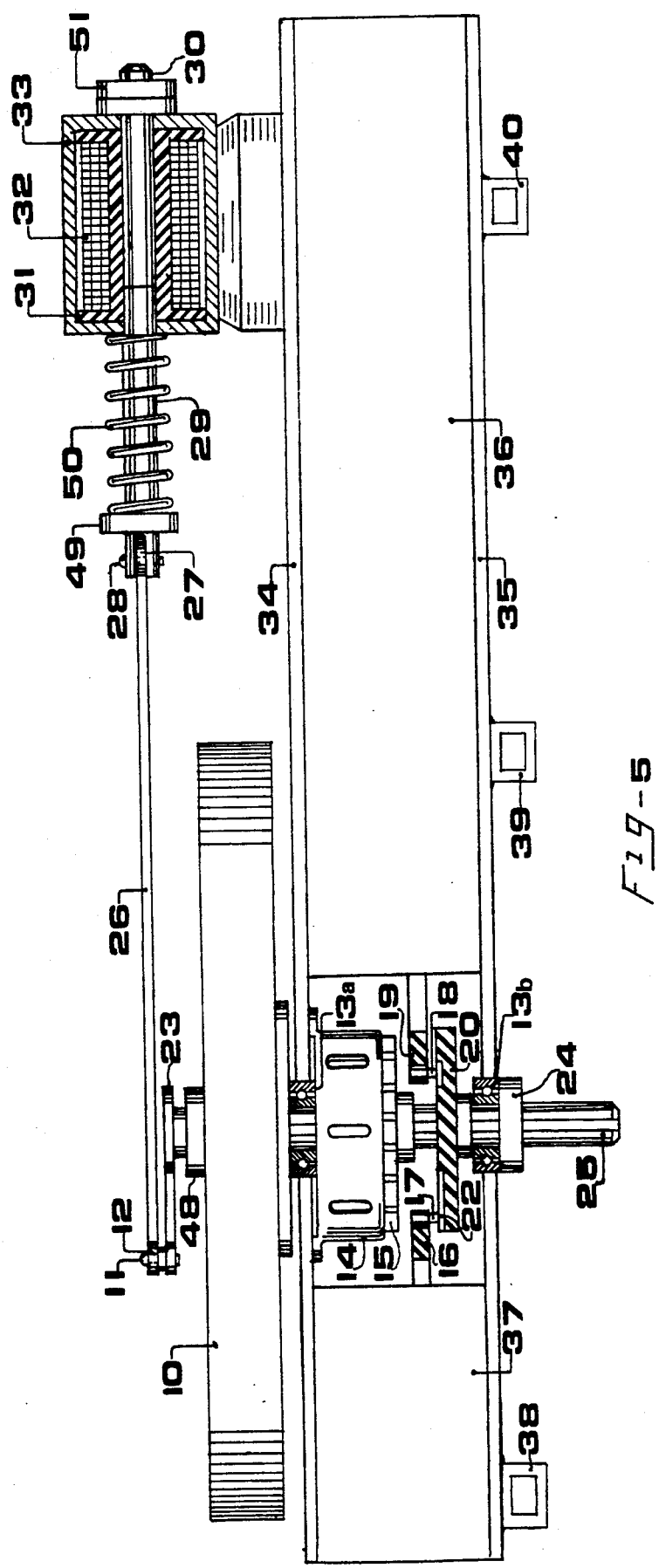
FIG. 5 is a side elevation view of the invention which illustrates and allows free wheeling of the fly-wheel (under no load conditions). This configuration is similar to FIG. 1, except that a number of additional parts are included.

FREE WHEELING FLY-WHEEL VERSION:

Requirements for the free wheeling fly-wheel version of the invention (under no load conditions) is shown in FIG. 5 of the drawings, in which: An overrunning clutch 48 is connected to the main shaft 25 above rotor 10 (fly-wheel). Cranking lever 23 is attached to the actuating shaft of the overrunning clutch 48. This configuration differs from the previous arrangements of FIG. 1 and FIG. 3 in that cranking lever 23 does not revolve with rotor 10 and main shaft 25. Actuation of the overrunning clutch 48 allows the main shaft and rotor to revolve in one direction only, clockwise.

When a pulse of current energizes inductor 32 through commutation, core 29 is pulled into the inductor, actuating overrunning clutch 48 through cranking lever 23 via connecting rod 26 connected to the magnetic core 29. This action causes rotor 10 to spin. When inductor 32 is de-energized, the magnetic core assembly 29 and 30 is returned to its original position by reset spring 50. Item 49 serves to contain reset spring 50 and item 51 serves as a reset position stop.

Figure 6:
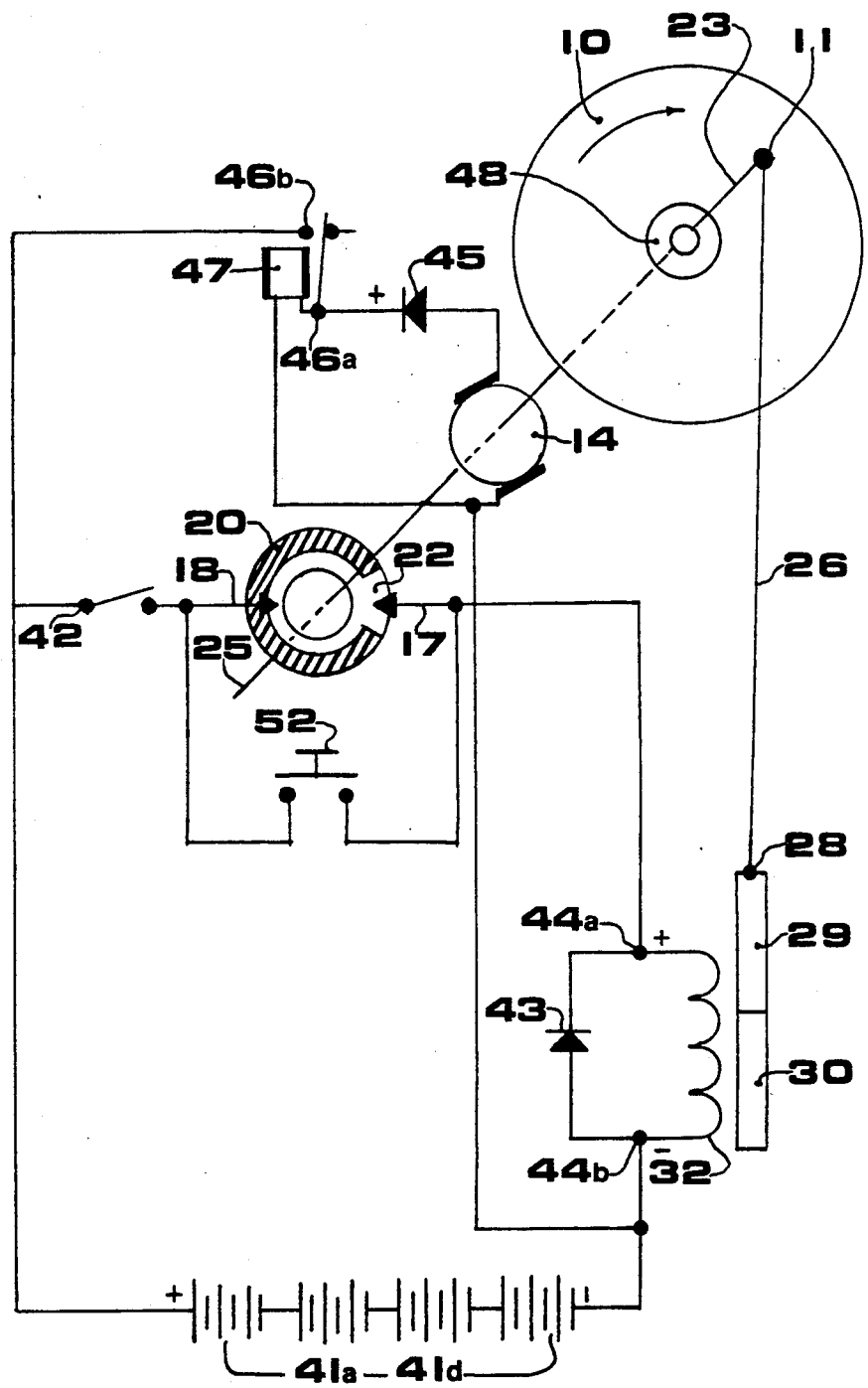
FIG. 6 is a schematic drawing of the electrical wiring for the free wheeling fly-wheel version of the invention and this drawing includes a starter switch, which is explained in the text of the detailed description of the invention.

Referring to the schematic drawing of FIG. 6, a momentary starting switch 52 has been included, since this version of the invention allows positive starting of the device regardless of the location of the brushes on the commutator 20 when main switch 42 is operated to the on position.

A starter motor device must be used for large and heavy versions of FIG. 1 and FIG. 3 for the following reason when referring to the schematic drawing of FIG. 2 for example: If main switch 42 was operated to the on position to start the device and brush 17 was not on contact disc 22, commutation would not begin until brush 17 was in the position as shown, however on a small version of the device all that would be required to begin commutation is to turn rotor 10 by hand until the device starts.

In addition to the positive starting feature of the free wheeling fly-wheel version of the invention described in the above paragraphs, higher rotor speeds can be achieved due to the balanced rotor configuration, when compared to the fixed eccentric connection shown on the drawings of FIG. 1 and FIG. 3.

The invention claimed is:

1. A pulsed electro-mechanical high torque solenoid driven motor comprising two principal assemblies adjacent, drivingly connected in linear-to-rotary power-transmitting relationship on a main frame with bearing means supporting, a first horizontal balanced flywheel and a vertical drive shaft assembly means which includes on said drive shaft assembly means; an alternator and fan assembly means, a one-way clutch means, a cranking lever means operatively connected to the said one-way clutch means, a commutator assembly means to electrically pulse from a rechargeable battery power supply means, an adjacent horizontal electromagnetic solenoid driver assembly means comprising, an inductor wound on a bobbin secured within a solenoid housing means mounted to the said main frame, said bobbin acting as a linear non-metallic bearing means for sliding a magnetic core assembly means within, with said magnetic core assembly comprising a magnetic core with a non-magnetic extension acting as a follower means, with said magnetic core assembly having ends, one of said ends extends through the said solenoid housing held captive with a stop collar and stop pad means, with the other of said ends secured with a containment collar to hold captive a compression type reset position spring means between said containment collar and solenoid housing, with said magnetic core assembly pivotally attached to a connecting rod linkage means, the opposite remote end of said connecting rod linkage pivotally attached to the said cranking lever of the first horizontal balanced flywheel and vertical drive shaft supported assembly to drivingly actuate the said one-way clutch during on periods of electrical commutation delivering electromechanical linear-to-rotary power transmission to the said drive shaft assembly, whereby during interrupted periods of electrical commutation, the said cranking lever is returned to reset position by the said reset position spring means, operatively disengaging the said one-way clutch from the said drive shaft assembly, wherein the said flywheel revolves in one direction, maintained in balanced relationship therewith.

* * * * *